Nov. 12, 1940.        H. H. BUBAR        2,221,073

DUST SEPARATOR

Filed Nov. 28, 1938

INVENTOR
Hudson H. Bubar
BY Nathaniel Frucht
ATTORNEY

Patented Nov. 12, 1940

2,221,073

UNITED STATES PATENT OFFICE 2,221,073

DUST SEPARATOR

Hudson H. Bubar, New York, N. Y.

Application November 28, 1938, Serial No. 242,756

3 Claims. (Cl. 183—75)

My present invention relates to the art of dust collecting and has particular reference to a novel construction for dust collecting apparatus.

The principal object of my invention is to provide an efficient dust collector which can handle large gas volumes at high efficiency, at a material reduction in cost.

It is a further object of my invention to provide a dust collector capable of collecting both heavy and fine dust, and which has a very low draft loss, thus rendering the collector suitable for use with minimum fan-power requirements or with natural draft equipment.

Another object of my invention is to provide a dust collector which has no moving parts, the dust collector being of relatively light weight and occupying a small amount of space, whereby the apparatus may be readily installed in cramped quarters such as are ordinarily available in city power plants.

With the above and other objects and other advantageous features in view, my invention consists of a novel apparatus more fully disclosed in the detailed description following, in conjunction with the accompanying drawing, and more specifically defined in the claims appended thereto.

Figures 1, 2:
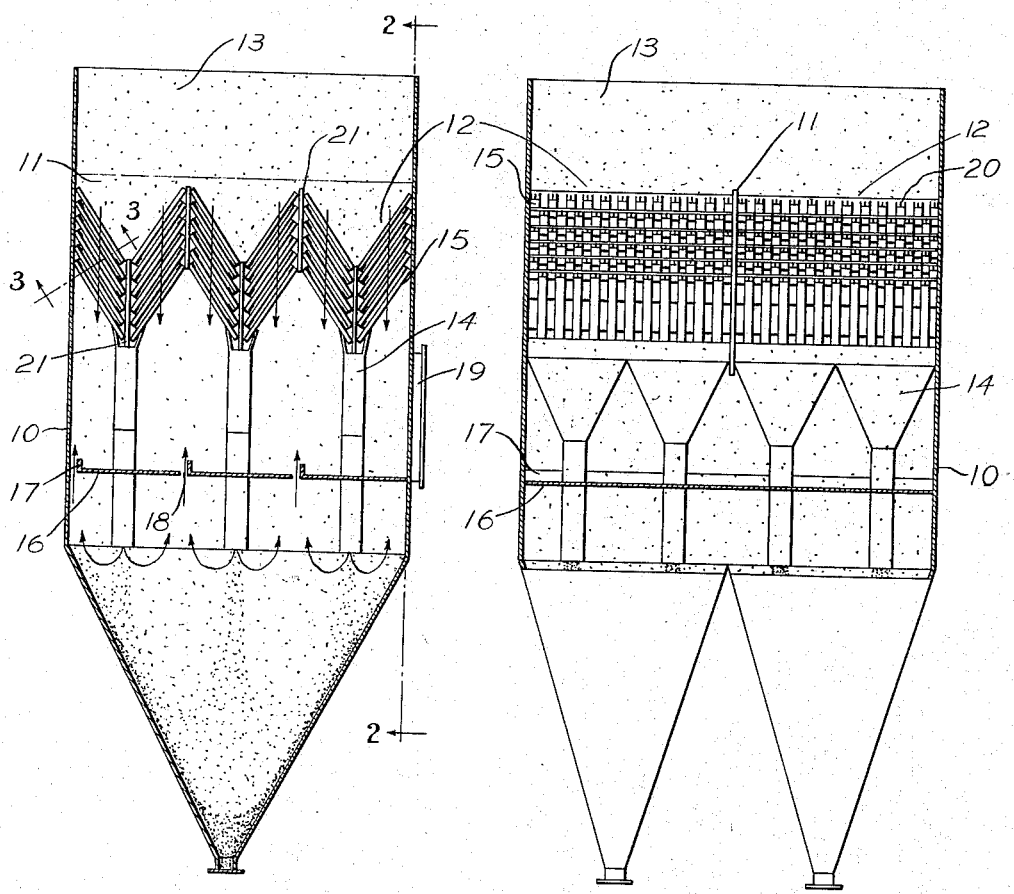
Fig. 1 is a vertical central section of the novel dust collector.
Fig. 2 is a transverse vertical section on the line 2—2 thereof.
Figure 3:
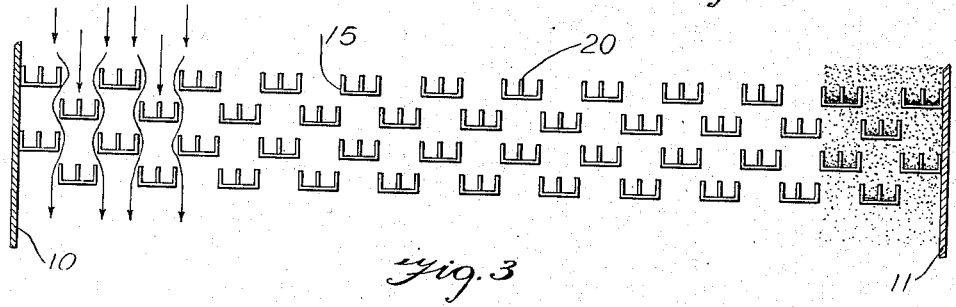
Fig. 3 is an enlarged section on the line 3—3 of Fig. 1.

Referring to the drawing, the novel dust collecting apparatus includes a vertical housing 10, which is preferably of rectangular form, and is divided by a vertical partition 11 into separate flow chambers 12 which communicates at their upper ends with a common inlet chamber 13. Each flow chamber includes a plurality of funnel-shaped dust collectors 14, the collectors being positioned at the apices of deflector units formed of a plurality of parallel channels 15 which are spaced in inclined rows to form generally V-shaped units arranged in series, the deflectors in adjacent rows being staggered, each deflector having an enlarged upper portion and a narrow lower portion which seats within the upper portion of the dust collecting chamber, flat plates 16 being provided to separate the flow chambers from the dust collecting hoppers underneath.

The flat plates, as shown in Fig. 2, are flanged at one end as indicated at 17, and are spaced from each other to provide gas upflow passageways 18, whereby gas passing through the collectors with entrained dust may escape upwardly to rejoin the gas exiting through the gas outlet 19, which is preferably at one side of the flow chambers, adjacent the lower portion thereof. The deflector channels are preferably of rectangular form, open at the top, and having an intermediate vertical plate 20 so as to form a rectangular shaped guide passages against which the dust laden gases impact, the deflectors converging towards vertical guide plates 21 which guide the separated dust downwardly into the collectors and thus into the dust receiving chamber.

The dust laden gas which enters through the inlet thus impacts a series of spaced deflector channels to dislodge the entrained dust, the gas rising and then passing between the spaced deflector channels to impact the deflector channels of the succeeding series, thus being divided in a plurality of separate gas streams which pass serially through the separate deflectors, the gas being purified by removal of the dust by impact and deflection, aided by gravity separation, and then passing laterally from the gas outlet. Any gas which passes downwardly through the deflectors to the dust collecting chamber with the entrained dust, as described supra, then flows upwardly through the plate passageways to join the exiting purified gases.

It is thus evident that the novel dust collecting apparatus comprises an upright housing which receives dust laden gas, divides the dust laden gas into a plurality of separate streams, cleans the separate streams serially by impact and by deflection, and permits the cleaned gases to exit at the lower portion of the apparatus. Although specific rectangular channel deflectors have been disclosed, it is obvious that any other construction of deflector unit may be used, for permitting gas impact thereon and for guiding the gas flow downwardly between adjacent deflectors to again impact. Although the deflector channels are preferably rectangular shaped as disclosed, it is obvious that any type of deflector may be used, for permitting the gas flow to first impact and then to flow between adjacent deflector elements and again impact, so as to produce dust separation by impact and by deflection, aided by gravity separation.

The apparatus is easily manufactured, used as a small number of readily assembled parts, which are relatively inexpensive, and handles a large gas volume at high efficiency. Moreover, the collecting apparatus is of relatively light weight, and may be made of any size and readily increased in size to meet additional load requirements.

The above described apparatus has been found to have a very high collection efficiency; for example, this type of apparatus as obtained from 80% to 85% separation of ash resulting from the combustion of pulverized fuel.

While I have described a specific constructional embodiment of my invention, it is obvious that changes in the number and relative positioning of the deflectors and of the type of deflectors used, may be made to suit the requirements for different dust collecting operations, without departing from the spirit and the scope of the invention as defined in the appended claims.

I claim:

1. In a dust separator comprising a housing having a dust receiving chamber and a deflector unit spaced from the top and bottom of said housing to provide inlet and outlet chambers, a deflector unit comprising a plurality of superimposed rows of spaced parallel open channel deflectors arranged in V-shaped and having a collector funnel at the apex of said V-shape extending through the outlet chamber and into the dust receiving chamber, said dust receiving chamber being separated from said outlet chamber by spaced flat plates having outlet vents therebetween, one edge of each plate having a flange.

2. In a dust separator comprising a housing having a dust receiving chamber and a deflector unit spaced from the top and bottom of said housing to provide inlet and outlet chambers, a deflector unit comprising a plurality of deflector sections abutting each other in an inverted V-shape, each section comprising a plurality of superimposed rows of spaced parallel deflectors arranged in V-shape and having a collector funnel at the apex of each section extending through the outlet chamber and into the dust receiving chamber, said deflectors including rectangular open channel members having intermediate vertical plates forming two rectangular guide passages in each channel member.

3. A deflector unit for a dust separator comprising a central vertical baffle, a plurality of superimposed rows of spaced open channel parallel deflectors angularly abutting each side of said baffle in a V-shape, each deflector comprising a rectangular channel member divided into two guide passageways, and a collector funnel at the apex of said rows, said baffle extending into said funnel.

HUDSON H. BUBAR.